United States Patent [19]

Nagashima et al.

[11] Patent Number: 5,134,604
[45] Date of Patent: Jul. 28, 1992

[54] COMBINATION OPTICAL DATA MEDIUM WITH MULTIPLE DATA SURFACES AND CASSETTE THEREFOR

[75] Inventors: Michiyoshi Nagashima, Nara; Fumiaki Ueno, Hirakata; Hiroyuki Ogawa, Moriguchi; Toshinori Kishi, Osaka; Taro Nambu, Kobe, all of Japan

[73] Assignee: Matsushita Electric Industrial Co., Ltd., Osaka, Japan

[21] Appl. No.: 637,154

[22] Filed: Jan. 3, 1991

[30] Foreign Application Priority Data

Jan. 11, 1990 [JP] Japan .................................. 2-5826

[51] Int. Cl.⁵ .................... G11B 3/74; G11B 7/20; G11B 7/00; G11B 3/70
[52] U.S. Cl. ...................... 369/94; 369/112; 369/283
[58] Field of Search ............... 369/280, 282, 283, 284, 369/286, 288, 275.1, 275.3, 275.4; 346/135.1

[56] References Cited

U.S. PATENT DOCUMENTS

| | | | |
|---|---|---|---|
| 3,999,009 | 12/1976 | Bouwhuis | 369/94 |
| 4,441,179 | 4/1984 | Slaten | 369/275.1 X |
| 4,450,553 | 5/1984 | Holster et al. | 369/94 |
| 4,542,495 | 9/1985 | Ziegler et al. | 369/291 X |
| 4,569,038 | 2/1986 | Nakashima et al. | 369/44 |
| 4,724,533 | 2/1988 | Ohara et al. | 369/112 |
| 4,858,050 | 8/1989 | Ashe et al. | 369/291 X |

FOREIGN PATENT DOCUMENTS

| | | | |
|---|---|---|---|
| 60-40542 | 3/1985 | Japan | 369/284 |
| 60-219647 | 11/1985 | Japan | 369/275.1 |
| 61-278056 | 12/1986 | Japan | 369/275.4 |
| 63-298836 | 12/1988 | Japan | 369/275.1 |
| 1-98140 | 4/1989 | Japan | 369/275.1 |
| 2017379 | 10/1979 | United Kingdom . | |

Primary Examiner—Stuart S. Levy
Assistant Examiner—Christopher R. Glembocki
Attorney, Agent, or Firm—Wenderoth, Lind & Ponack

[57] ABSTRACT

An optical data medium is disclosed from which information recorded to the surface is reproduced by focusing a laser thereon and reading the light reflected from the data surface. The medium includes a first transparent layer having a top data surface for carrying data, and a second transparent layer having a bottom data surface for carrying data. A semi-transparent layer is inserted between the first and second transparent layers. When the laser is focused on the top data surface, the data carried therein is reproduced, and when the laser is focused on the bottom data surface, the data carried therein is reproduced.

7 Claims, 8 Drawing Sheets

COMBINATION OPTICAL DATA MEDIUM WITH MULTIPLE DATA SURFACES AND CASSETTE THEREFOR

BACKGROUND OF THE INVENTION

1. Field of the Invention

The present invention relates to an optical data medium for recording and reproducing data by the use of a laser beam and a method for making the same. The present invention also relates to a cassette casing for carrying the optical data medium.

2. Description of the Prior Art

Optical data media in such forms as optical cards and disks are now commercially available with optical disks in particular being widely distributed as compact discs and laser discs. Higher data densities are desirable for a variety of reasons, including the ability to make CDs smaller and to enable the recording of High Definition Television (HDTV) compatible video discs.

One method considered possible for achieving a high data density in an optical data medium was to focus the read laser to an even finer beam diameter, but the maximum practical limit to the numerical aperture (NA) of the objective lens which focuses the laser is approximately 0.6. It would also be possible to obtain a similar result by shortening the laser wavelength, but a wavelength of a practical semiconductor laser is limited to approximately 670 nm for the present. A second method is a new method whereby a high density is proposed to be achieved using V-grooves in the optical disk, such as disclosed in U.S. Pat. No. 4,569,038 issued Feb. 4, 1986 to Nagashima et al.

The capacity of the data that can be achieved on an optical disk using conventional technologies is determinable. For an optical disk housed in a 3.5 inch cassette case, the disk diameter is approximately 86 mm, providing a data storage area with a radius of 25 mm to 41 mm. It is assumed that a 670 nm wavelength laser is used with a 0.55 NA objective lens. With a 0.8 μm track pitch (1.6 μm V-groove pitch) and 0.47 μm bit length, the unformatted single-side capacity is 1.1 Gbytes. Using the standard CD format, a single-side formatted capacity of 550 Mb, the same as a 12 cm CD, can be obtained, but this is currently the maximum limit.

If information conventionally provided as printed material is to be provided in the future on a CD-ROM or other optical data medium, it will also be necessary and convenient if the user is able to write to the medium to record notes as is done currently with paper media, instead of only being able to read the information. One method which makes this possible divides the disk into a read/writable areas, wherein a recording film is formed on the inside portion of the disk, and a read-only area comprising a reflective metal film on the outside portion of the disk. However, this method reduces the read-only data area, and therefore limits the amount of information distributable on a single disk.

As thus described, while smaller, higher capacity optical data media, including optical disks and cards, are desirable, current technologies are already at or near the recording density limit. In addition, there is a demand for a read-only data distribution medium in which an area which can be written to by the user is provided with a minimal decrease in the read-only area.

In addition, CDs, video discs, and similar optical discs are not housed in a cassette case as are floppy disks and other magnetic data media. However, while optical disks are read with a non-contact pickup, the playback signal quality can still be degraded by oil and other foreign matter deposited on the surface by, for example, touching the surface with the fingers during disk loading and unloading. As a cassette case typically has a shutter which remains closed and hides the disk surface at all times other than during playback, it is now considered necessary and preferable to house optical discs in a cassette case.

SUMMARY OF THE INVENTION

The object of the present invention is therefore to provide an optical data medium for recording and/or reproducing data with a higher density.

It is also an object of the present invention to provide a method for making such an optical data medium.

A further object of the present invention is to provide a cassette case which houses the optical data medium.

According to the present invention, an optical data medium from which information recorded to the surface thereof is reproduced by focusing a laser thereon and reading the light reflected from the data surface, comprises: a first transparent layer having a first and second surfaces, said second surface being a first data surface carrying data; a semi-transparent layer deposited on said second surface; a second transparent layer having a third and fourth surfaces, said third surface being held in contact with said semi-transparent layer and said fourth surface being a second data surface carrying data; and a reflection layer deposited on said fourth surface.

According to the present invention, a method for manufacturing an optical data medium from which information recorded to the surface thereof is reproduced by focusing a laser thereon and reading the light reflected from the data surface, comprises the steps of: forming a first transparent layer having first and second surfaces, said second surface being a first data surface carrying data; forming a semi-transparent layer deposited on said second surface; forming a second transparent layer having third and fourth surfaces, said third surface being held in contact with said semi-transparent layer and said fourth surface being a second data surface carrying data; and forming a reflection layer deposited on said fourth surface.

According to the present invention, a cassette case for an optical data medium comprises: a casing for accommodating an optical data medium; a shutter movably mounted on said casing and having a first window; and a transparent plate mounted in said first window.

BRIEF DESCRIPTION OF THE DRAWINGS

These and other objects and features of the present invention will become clear from the following description of the preferred embodiments thereof with reference to the accompanying drawings throughout which like parts are designated by like reference numerals, and in which.

DETAILED DESCRIPTION OF THE PREFERRED EMBODIMENTS

Optical System

Figure 11:
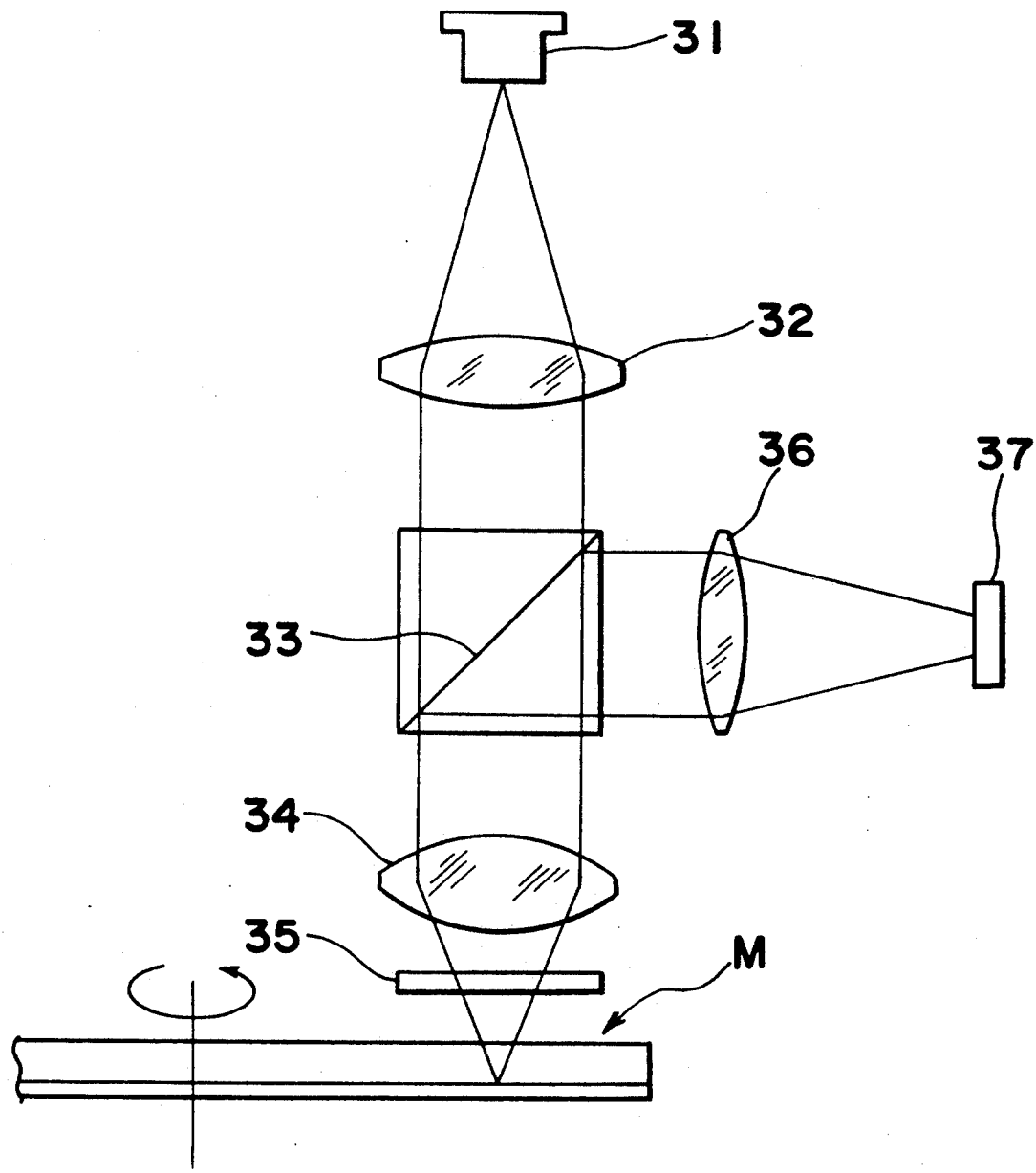
FIG. 11 is a diagrammatic view of the optical system for reading/writing the optical data medium.

Referring to FIG. 11, an optical system for recording and/or reproducing data on and/or from optical data medium of the present invention is shown. A laser beam emitted from a laser source 31 passes through a collimator 32 to produce parallel laser rays. The laser beam passing through a half mirror 33 is focused on an optical data medium M, such as an optical disk, by an objective lens 34.

As will be described in detail below, the optical data medium M has top and bottom data storing layers. For focusing the laser beam on the top data storing layer, a transparent plate 35 having a predetermined thickness and a predetermined refractive index is inserted in the laser beam path, preferably between the objective lens 34 and the optical data medium M. For focusing the laser beam on the bottom data storing layer, such a transparent plate 35 is removed.

A laser beam reflected from the optical data medium M is further reflected from the half mirror 33 and is focused on a detector 37 by a suitable lens assembly 36. The focus/defocus signal picked by the detector 37 is used for controlling the objective lens 34 so as to adjust the focusing condition of the laser beam on the optical data medium M. Also, the signal picked by the detector 37 is used for reproducing the data stored on the optical data medium M.

Optical Data medium

First Embodiment

Figure 1:
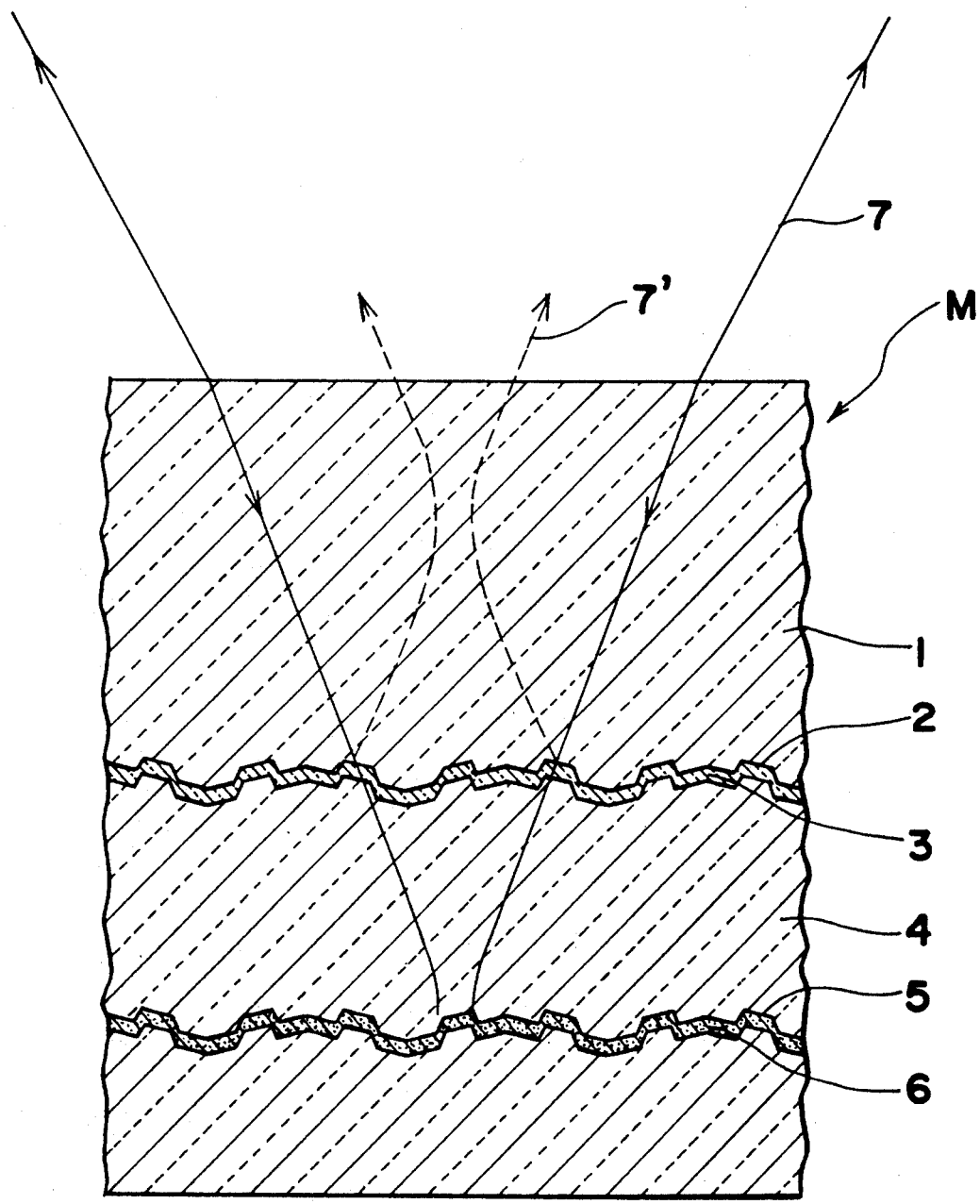
FIG. 1 is a fragmentary cross-sectional view of an optical data medium according to a first embodiment of the present invention, and particularly showing the laser focused at a bottom memory layer.
Figure 2:
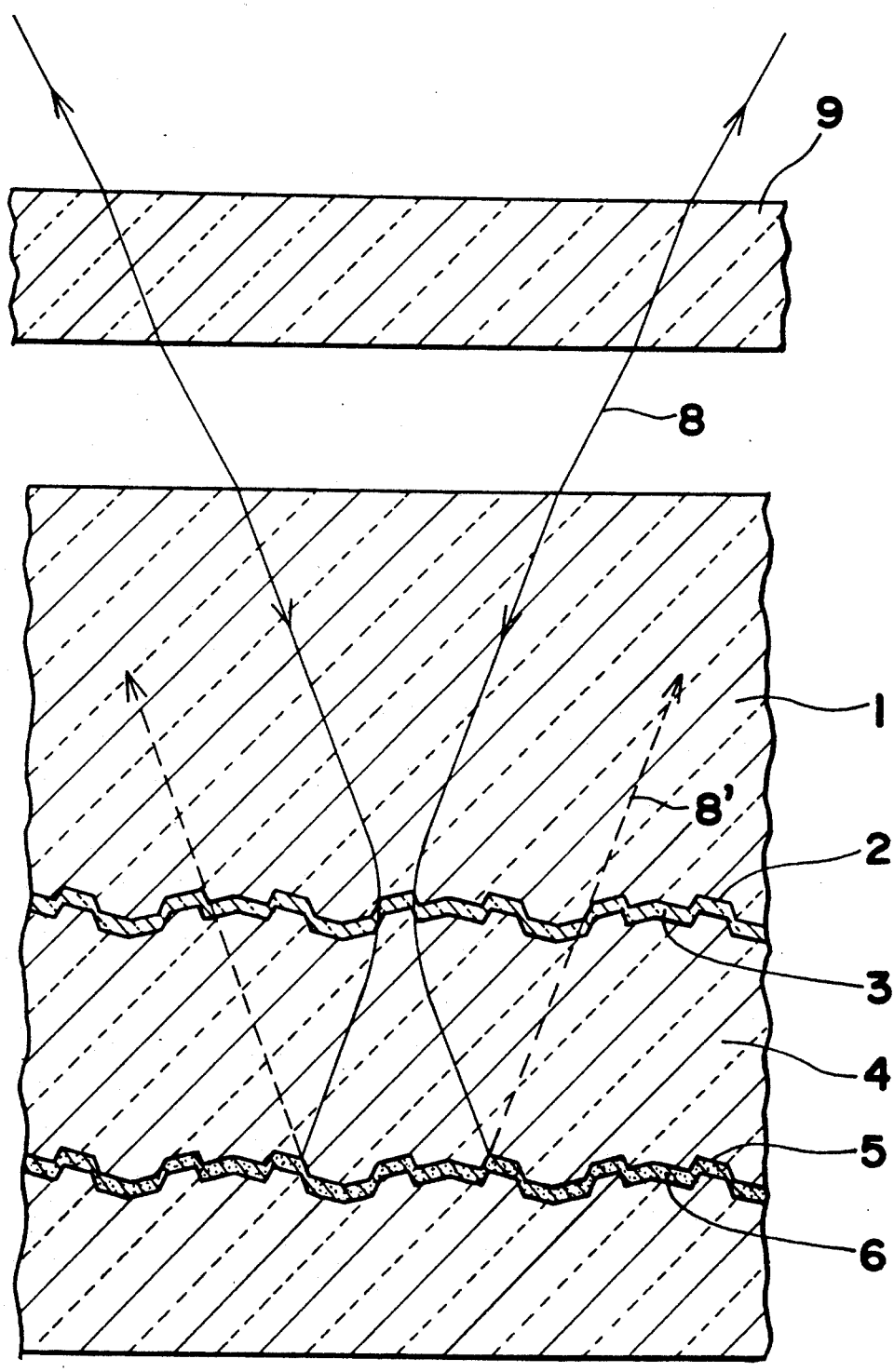
FIG. 2 is a fragmentary cross-sectional view of an optical data medium according to the first embodiment of the present invention, and particularly showing the laser focused at a top memory layer.

Referring to FIGS. 1 and 2, an optical data medium M according to the first embodiment of the present invention comprises two data storing layers of the read-only type. In FIGS. 1 and 2, reference number 1 is a transparent material layer 1 of glass or plastic, on one side of which is formed a data surface 2. In the embodiment shown in FIG. 1, data is written to the slopes of the V-grooves. Under data surface 2 is formed a semi-transparent thin film 3 to reflect only part of an incident laser. Under the semi-transparent thin film 3 is formed a transparent material layer 4, and on a lower surface of which is formed a data surface 5. A reflective film 6 (non-transparent material film) made of aluminum or any other metallic material is formed under the data surface 5 so as to reflect substantially all incident laser light thereat. A protection layer 10 is provided on film 6. Thus, the optical data medium M of the first embodiment has the top data storing layer formed by top data surface 2 and thin film 3, and the bottom data storing layer formed by bottom data surface 5 and the film 6.

FIG. 1 shows the laser beam 7 focused on the bottom data surface 5 which is the farther one of the two data surfaces from the laser source. In this case, the data signal recorded on the bottom data face 5 can be reproduced because the laser 7 is focused on the data surface 5, but it should be noted that part of the laser as indicated by 7' is also reflected by the top data surface 2. However, if the distance between the top and bottom data surfaces 2 and 5, in which the transparent material 4 is located, is sufficiently large, such as 100 μm or greater, the diameter of the laser beam on the top data surface 2 is sufficiently large to prevent identification and reproduction of the signal recorded on the top data surface 2, and the playback signal from the data surface 5 is therefore not adversely affected. Furthermore, if the semi-transparent thin film on the data surface 2 is formed uniformly, the incident laser is unaffected by local phase changes, and diffraction phenomena unsuitable to signal reproduction can be virtually ignored.

FIG. 2 shows the laser beam 8 focused on the top data surface 2 near the laser incidence side. Because the laser spot is focused on the top data surface 2, the data signal recorded thereto can be reproduced, but part of the laser also passes through the semi-transparent thin film 3 and is reflected by the bottom data surface 5. The reflected light is indicated by 8'. However, since the thickness of the transparent material layer 4 is sufficiently large, the diameter of the laser beam on the data surface 5 is sufficiently great, as in the first case described above. Thus, the signal recorded to the bottom data surface 5 cannot be identified and reproduced, and the playback signal from the top data surface 2 is therefore not adversely affected.

According to the first embodiment, for the objective lens to sufficiently focus the laser, the thickness of the transparent material between the objective lens and the data surface must be adjusted so that the product of the transparent material layer thickness and the refractive index is a value determined according to the objective lens. For example, in an objective lens used for CDs and video discs, the refractive index of the disc substrate is approximately 1.5 and the thickness is 1.2 mm. In the first embodiment, the sum of the thickness of the two transparent material layers 1 and 4 must be selected in consideration of the specific thickness determined by the objective lens.

In the condition shown in FIG. 1, the thickness of the transparent material layer between the objective lens 34 and the bottom data surface 5 to be read is the sum of the thicknesses of the two transparent material layers 1, 4, thereby enabling the laser to be sufficiently focused and making it possible to play back a high quality signal.

However, in the condition of FIG. 2, because the thickness of the transparent material layer between the objective lens 34 and the top data surface 2 to be read is the thickness of the first transparent material layer 1 only, the required thickness is not present, preventing the laser from being sufficiently focused and degrading the playback signal quality. Thus, to assure the required optical path length, a transparent plate 9 of a thickness which can compensate for the deficiency in the optical path is inserted between the objective lens and the top data surface 2 when reading the top data surface 2.

According to the first embodiment described above, two data surfaces are provided, but it is possible to provide more than two surfaces, as long as such data surfaces are spaced by a predetermined distance, such as 100 μm. The same principle applies when there are three or more layers. The reflectivity to the laser beam is reduced in each layer the closer the data surface is to the laser incidence side, thus enabling the laser to reach the data surface farthest from the laser incidence side for data reading. If the gap between differing data surfaces is made sufficiently large (e.g., more than 100 μm), the adverse affects of signals from data surfaces other than the one data surface being read can be ignored. In addition, the thickness of the transparent plate inserted between the objective lens and the disk needs only to be changed to maintain compatibility when reading from the data surfaces in three or more different layers.

Second embodiment

The optical data medium according to the second embodiment generally comprises a plurality of data surfaces, one of which can be read and written to by a laser while the remaining layers are read-only, so as not only to achieve a high data density and but also to enable the user to write new information at will.

Figure 3:
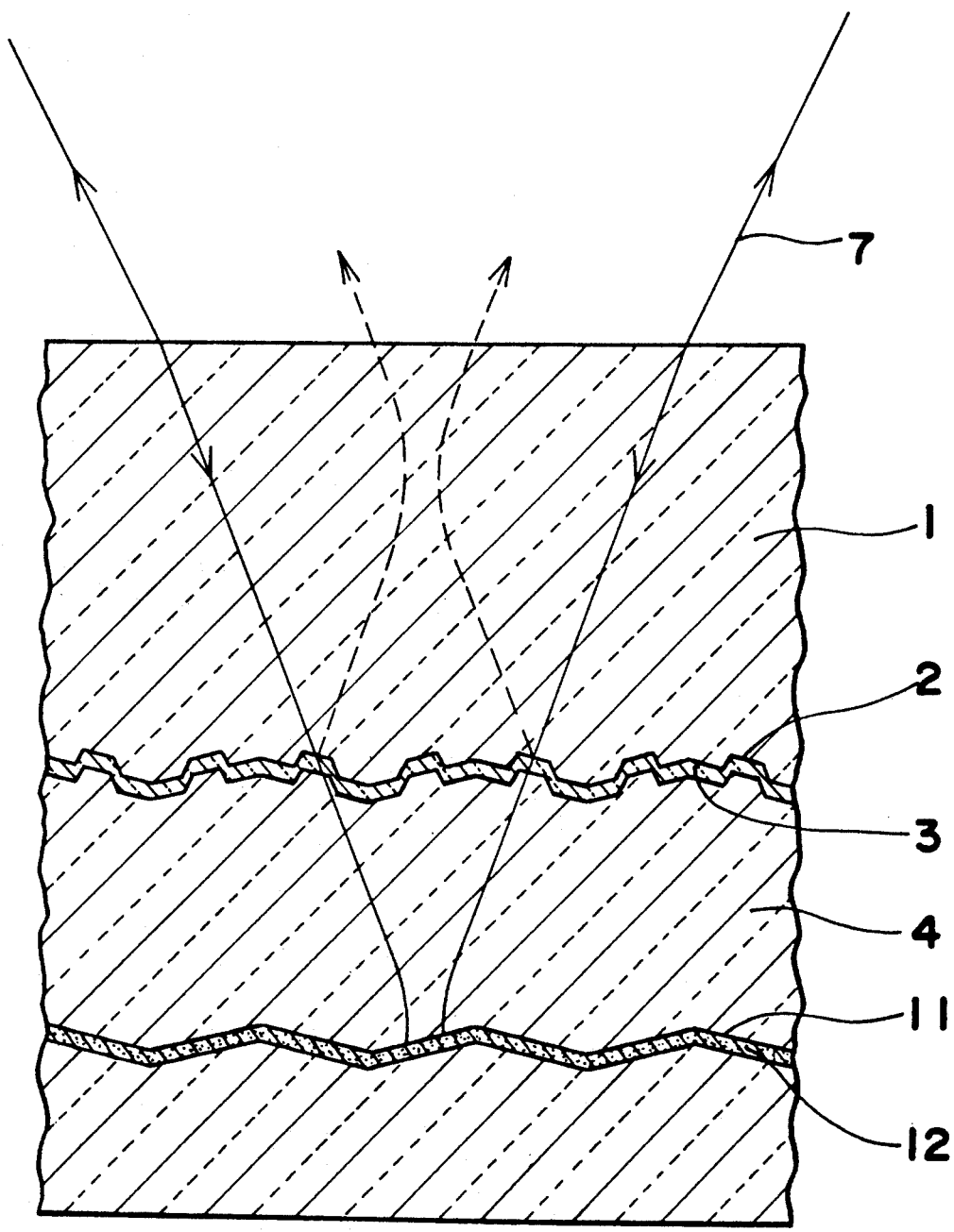
FIG. 3 is a fragmentary cross-sectional view of an optical data medium according to a second embodiment of the present invention, and particularly showing the laser focused at a bottom memory layer.
Figure 4:
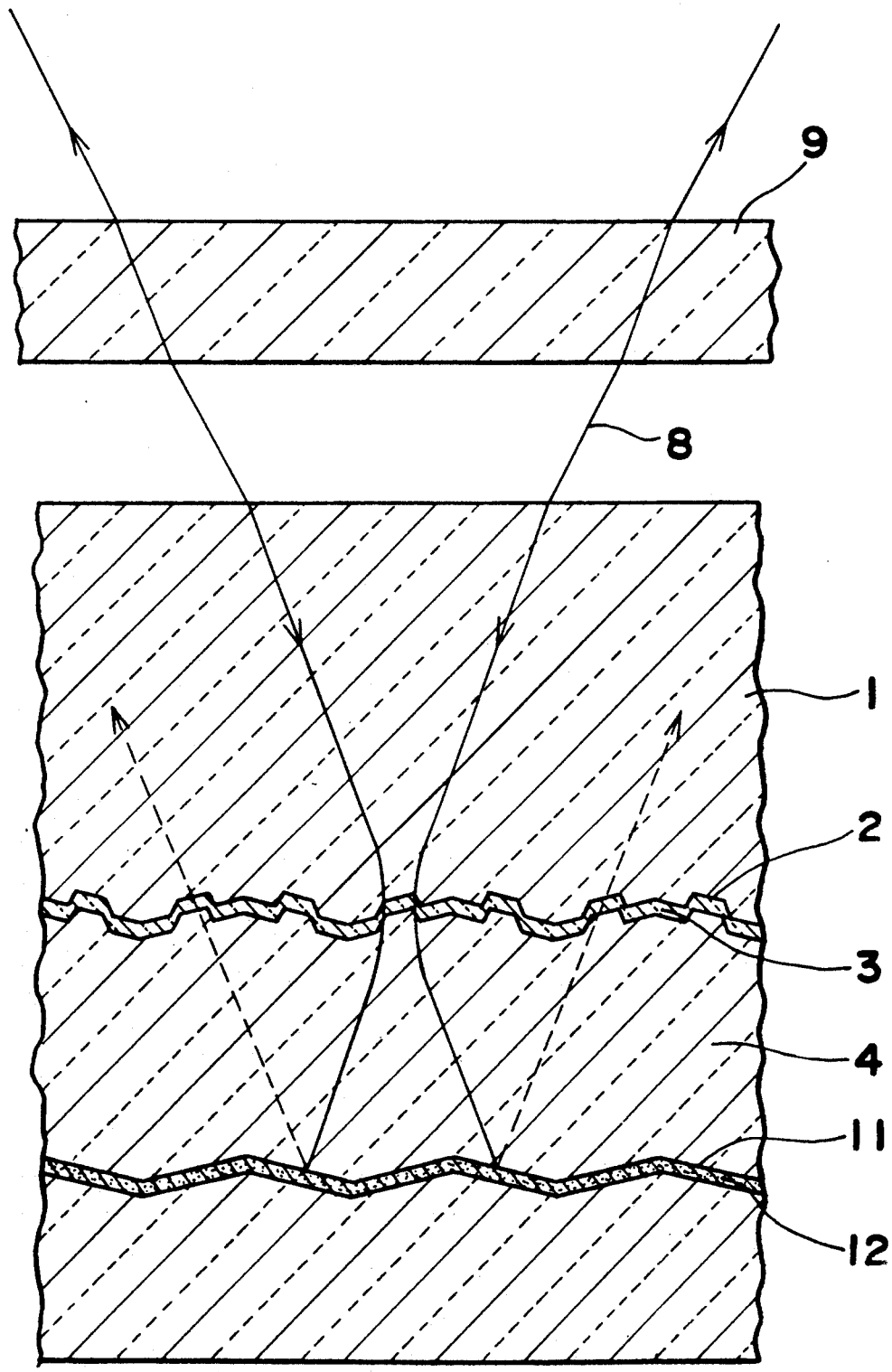
FIG. 4 is a fragmentary cross-sectional view of an optical data medium according to the second embodiment of the present invention, and particularly showing the laser focused at a top/memory layer.

Referring to FIGS. 3 and 4, an embodiment with a two-layer medium is described wherein the bottom data surface 11 farthest from the laser incidence side is read/writable, and the top data surface 2 nearest the laser incidence side is read-only. FIG. 3 shows the situation in which the incident laser 7 is focused on the read/writable bottom data surface 11; and FIG. 4 shows the situation in which the incident laser 8 is focused on the top data surface 2 nearest the laser incidence side. Like components in FIGS. 1, 2, 3, and 4 are indicated by like reference numbers and further description thereof is herein omitted.

The bottom data surface 11 is formed under the transparent material layer 4, and a recording layer 12 (non-transparent material film) is formed on the bottom data surface 11. Because information can be recorded by the user in this embodiment, there are no signal pits on the slopes of the V-grooves for data recording in the bottom data surface 11. The semi-transparent thin film 3 (non-transparent material film) is formed so that only part of the incident laser 7 is reflected. Therefore, the incident laser 7 can pass through the semi-transparent thin film 3 sufficiently, and reading from and writing to the recording layer 12 is therefore possible. If the thickness of the transparent material layer 4 is sufficient as described in the first embodiment hereinabove, the diameter of the laser beam on the bottom data surface 11 when reading from the top data surface 2, and the diameter of the laser beam on the top data surface 2 when reading from the bottom data surface 11 is large enough so that the signals from the other data surface do not adversely affect the signal being read from the one data surface.

The thickness of the transparent material layer 4 is 100 μm or greater. Furthermore, if the semi-transparent thin film 3 under the top data surface 2 is formed uniformly, the incident laser is not affected by local phase changes, and diffraction phenomena unsuitable to signal reproduction can be virtually ignored.

When the recording layer 12 is formed by a phase change material, the local reflectance of the recording layer 12 varies at a place where the recording layer 12 has data stored. Unlike the structure described above, if the top data surface 2 nearest the laser incidence side is formed with the read/writable recording layer, the intensity distribution of the laser beam passing through the recording layer may be varied depending on the data written in the recording layer. Thus, there may be a situation that the laser beam can not be sufficiently focused particularly when reproducing from the data surface furthest from the laser incidence side. Therefore, the read/writable recording layer should be formed at the furthest from the laser incidence side, and the read-only data surface should be formed nearest the laser incidence side.

The sum of the thickness of the two transparent material layers 1 and 4 must be selected in consideration of the thickness determined by the objective lens focusing on the bottom data surface 11. When reading and writing to the recording layer 12, the thickness between the objective lens and the read/write data surface is the sum of the thickness of the two transparent material layers 1 and 4, thereby enabling the laser to be sufficiently focused and making it possible to play back a high quality signal.

However, when reading from the data surface 2, because the thickness of the transparent material layer between the objective lens and the data surface to be read is the thickness of one transparent material layer 1, the required thickness is not present, preventing the laser from being sufficiently focused and degrading the playback signal quality. Thus, as described with reference to FIG. 2, to assure the required optical path length, a transparent plate 9 of a thickness which can absorb the deficiency in the optical path is inserted between the objective lens and the top data surface 2 when reading the top data surface 2.

An optical data medium comprising two layers was described hereinabove, but the same principle is true when there are three or more layers, in which case the data surface farthest from the laser incidence side is read/writable. The reflectivity to the laser beam is reduced in each layer the closer the data surface is to the laser incidence side, thus enabling the laser to reach the data surface farthest from the laser incidence side for data reading and writing. If the gap between differing data surfaces is made sufficiently large (e.g., 100 μm or more), the adverse affects of signals from data surfaces other than the one data surface being read can be ignored. In addition, the thickness of the transparent plate inserted between the objective lens and the disk needs only to be changed to reproduce the data from data surfaces in different layers.

Manufacturing Method

A method for making the optical data media described hereinabove is described below with reference to FIGS. 5 to 7.

Figure 5:
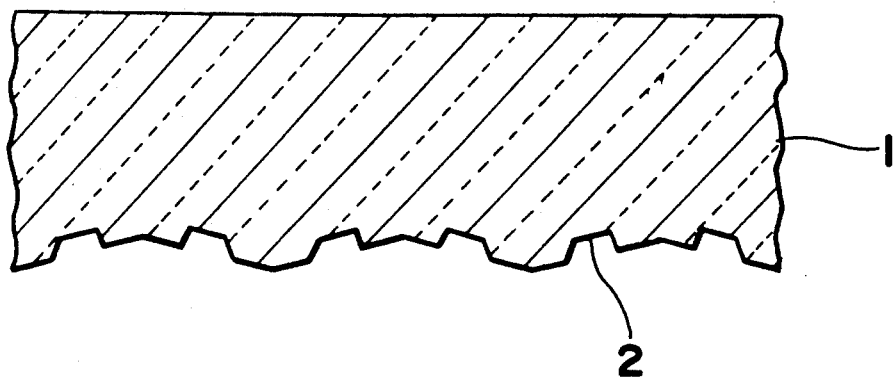
FIG. 5, FIG. 6, and FIG. 7 are cross sectional views showing steps for making an optical data medium according to the present invention.
Figure 5:
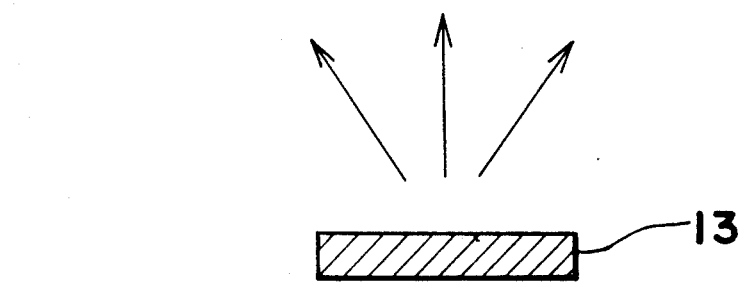

Referring to FIG. 5, reference number 1 is the transparent material layer on one side of which is formed the data surface 2. The transparent material layer 1 can be formed by an injection molding process as used in CD and video disc replication. The semi-transparent thin film 3 is formed on the data surface 2 by vacuum deposition. Reference number 13 is the target material used for forming the semi-transparent thin film.

Figure 6:
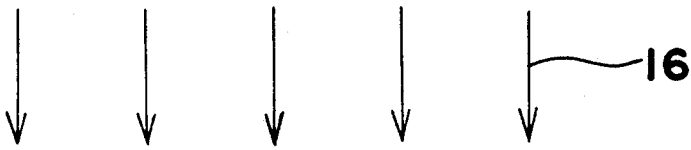
Figure 6:
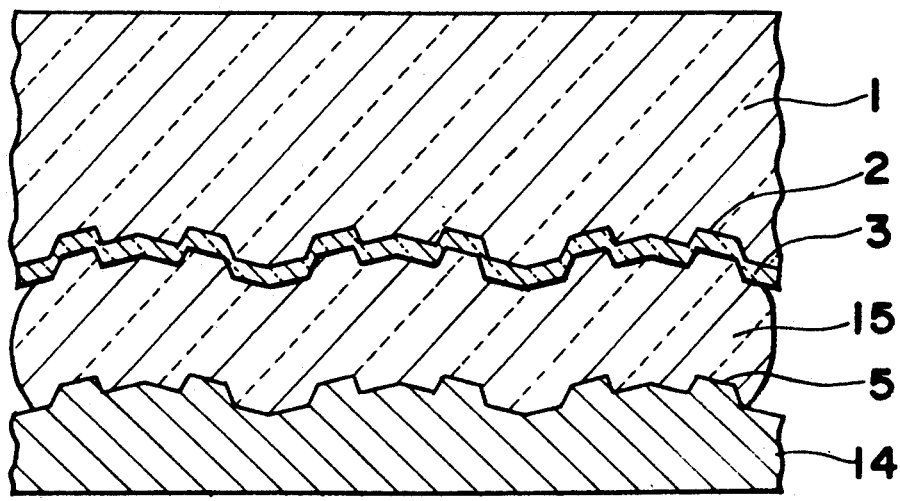

As shown in FIG. 6, a UV (ultraviolet ray) curable resin 15 is inserted between a stamper 14, which produces the data surface 5 shown in the first embodiment (the same is true when producing the data surface 11 in the second embodiment), and the semi-transparent thin film 3 formed on the data surface 2. Then, pressure is applied to obtain a predetermined thickness, and ultraviolet light 16 is applied through the transparent material layer 1 and the semi-transparent thin film 3 to cure the UV resin 15.

Figure 7:
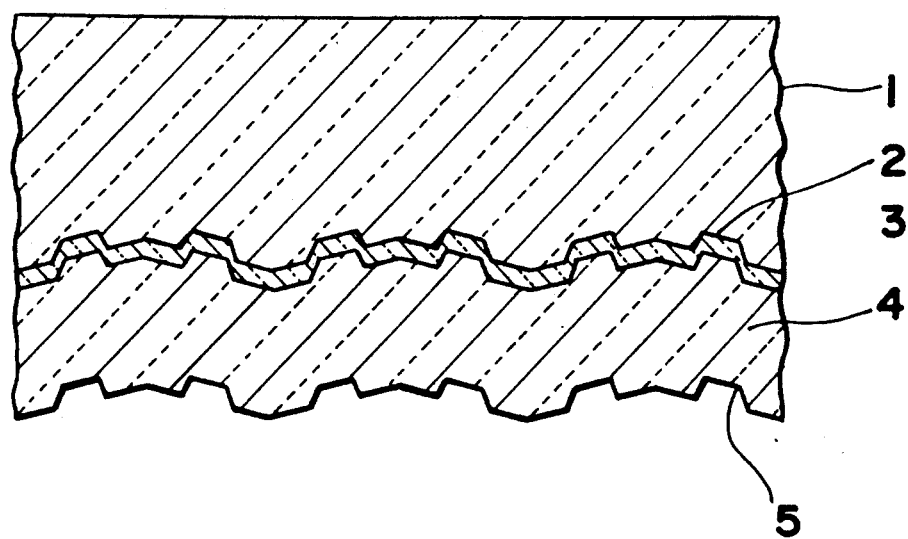
Figure 7:
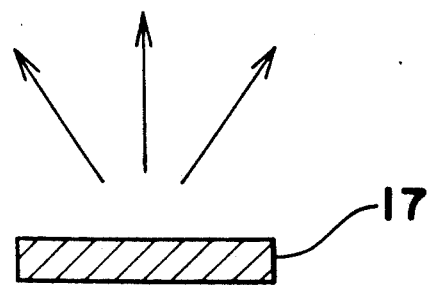

As shown in FIG. 7, a reflective film 6 (or recording layer 12) is formed by vacuum deposition on the data surface 5 (or data surface 11) thus formed. Reference number 17 is the target. An aluminum or other metallic material is used when forming the reflective film 6 in the first embodiment, and a phase change material or optomagnetic material is used when forming the recording layer 12 in the second embodiment. The protection layer 10 can be made in a manner similar to that described above by the use of UV curable resin.

It is important to note in this manufacturing method that ultraviolet light is passed through the transparent material layer 1 and the semi-transparent thin film 3 during manufacture. The semi-transparent thin film is a dielectric material with a refractive index that differs from the transparent material. When manufacturing a medium with three or more layers, laser reflection must decrease the closer the data surface is to the laser incidence side. This can be achieved by changing the thickness of the semi-transparent thin film to change the reflectivity of the layer.

Cassette Case

Figure 8:
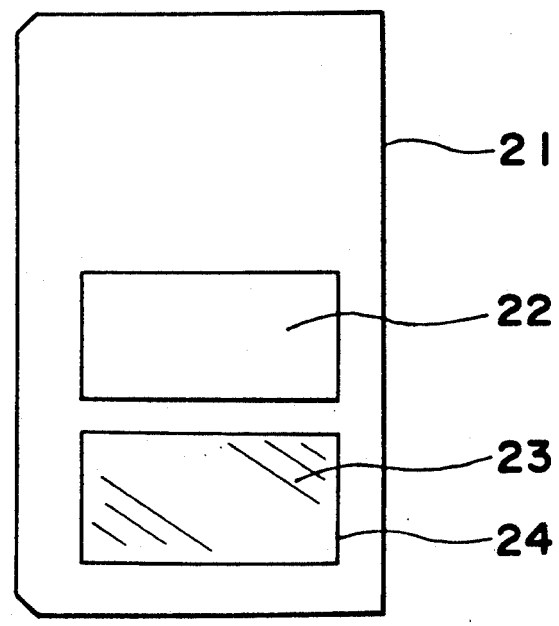
FIG. 8 shows a top plan view of a shutter used in a cassette case which holds the optical data medium of the present invention.

As described with respect to the first and second embodiments hereinabove, the thickness of the transparent material between the objective lens and the data surface must be a specific value. Thus, when reading the data surface nearest the laser incidence side in a two-layer optical data medium, a plastic, glass, or other transparent plate is inserted between the objective lens and the disk surface. It is convenient if this transparent plate is inserted or removed therebetween by operating a shutter mechanism on the cassette case. This shutter is shown in FIG. 8, wherein 21 is a shutter comprising two windows: a window 22 in which nothing is inserted, and a window 24 in which a transparent plate 23 is inserted.

The transparent plate 23 corresponds to the transparent plate 9 in the first and second embodiments, and is of a thickness to compensate for the thickness of the transparent material between the objective lens and the data surface.

Figure 9:
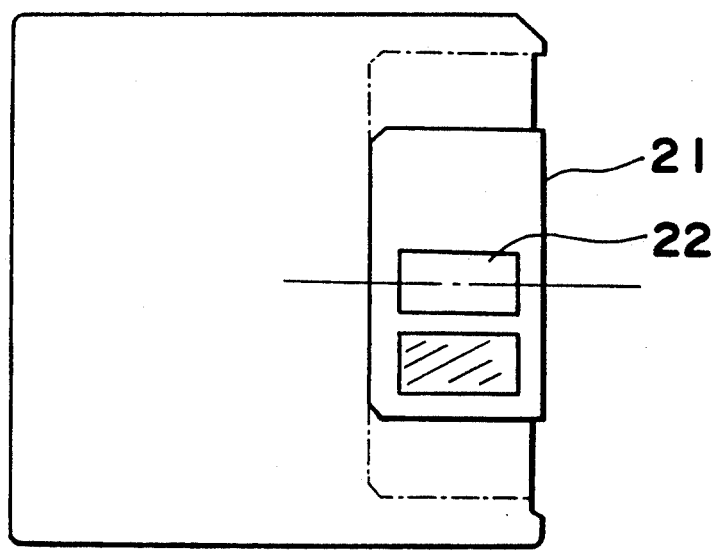
FIGS. 9 and 10 are top plan views of a cassette case of the present invention showing the positions of the shutter during the bottom memory layer reading and top memory layer reading, respectively.

During reading from the bottom data surface 5 in the first embodiment and reading/writing to the recording layer 12 in the second embodiment, the shutter 21 is moved as shown in FIG. 9 to position the window 22 in which nothing is inserted between the objective lens and the disk.

Figure 10:
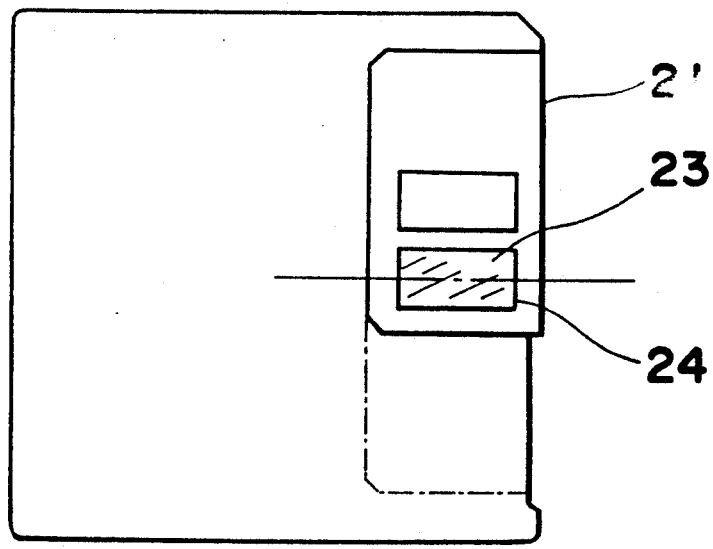

Furthermore, during playback of the top data surface 2 in the first and second embodiments, the shutter 21 is moved to position the window 24 in which the transparent plate 23 is inserted between the objective lens and the disk as shown in FIG. 10.

With the cassette case for a floppy disk, the shutter is located in the direction of insertion as seen from the center of disk rotation. Specifically, the shutter moves perpendicularly to the direction of cassette insertion. In the case of a cassette case which holds the optical data medium according to the present invention, the direction in which the cassette is inserted and the direction of shutter movement are parallel. Arrow X in FIG. 9 indicates the direction of cassette insertion. Thus, the direction from the center of disk rotation of the magnetic head used for floppy disk reading and writing and the optical head used for reading and writing to an optical disk can be changed, making it possible to provide a magnetic head and an optical head in the same drive, and thus making it possible to use both optical disks and floppy disks in the same drive.

When the medium has three or more layers, three or more windows must be provided in the shutter with nothing inserted in one window as when the medium has two layers. Furthermore, transparent plates of different thicknesses are inserted in the other windows to compensate for the thickness of the transparent material between the objective lens and the data surface of the disk.

Also, it is possible to form a shutter with only one window in which the transparent plate 23 is inserted. In this case, the shutter itself moves away to expose the medium.

By means of an optical data medium according to the present invention as described above, the area of the data surface is increased, thus dramatically increasing the recording density, and making it possible to provide an area to which the user can write information without reducing the read-only area.

Furthermore, by means of a manufacturing method for an optical data medium according to the present invention, the optical data media as described above can be easily and simply manufactured.

Moreover, by means of a cassette case which holds the optical data medium according to the present invention, the laser can be sufficiently focused for the data surface in each layer, and because the media surface is not directly touched, a high quality signal can be read and written, and the cassette case can be manufactured at a low cost with a simple construction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A combination comprising:
    a cassette and an optical data medium in said cassette and from which information recorded on a data surface thereof is reproduced by focusing a laser beam thereon and reading the light reflected from the data surface,
    said medium comprising:
    a first transparent layer having a first and
    a second surface, said second surface being a first data surface;
    a semi-transparent layer on said second surface;
    a second transparent layer having a third and a fourth surface, said third surface being in contact with said semi-transparent layer and said fourth surface being a second data surface; and
    a reflection layer on said fourth surface;
    and; said cassette comprising:
    a casing in which said medium is contained and having an opening therein which is normally open and through which the laser beam is directed onto said medium; and
    a transparent plate movably mounted on said casing for movement between a first position at which the transparent plate is at a position other than over said opening and a second position in which said transparent plate is over said opening, said transparent plate having a thickness for causing a laser beam directed through said opening onto the medium to be focused on one of said second and fourth surfaces with the laser beam focused on the other of said second and fourth surfaces when said transparent plate is not over said opening, and said first surface of said medium being exposed through said opening.

2. The combination as claimed in claim 1, wherein said reflection layer is a non-transparent layer.

3. The combination as claimed in claim 1, wherein said reflection layer is a semi-transparent layer.

4. The combination as claimed in claim 1, further comprising a protection layer on said reflection layer.

5. The combination as claimed in claim 1, wherein said first data surface is for a read-only data.

6. The combination as claimed in claim 1, wherein said second data surface is for a read-only data.

7. The combination as claimed in claim 1, wherein said second data surface is for a read/writable data.

* * * * *